W. R. DAVIS.
MOLD FOR CHIMNEYS AND THE LIKE.
APPLICATION FILED AUG. 14, 1914.
1,186,384.
Patented June 6, 1916.
3 SHEETS—SHEET 3.
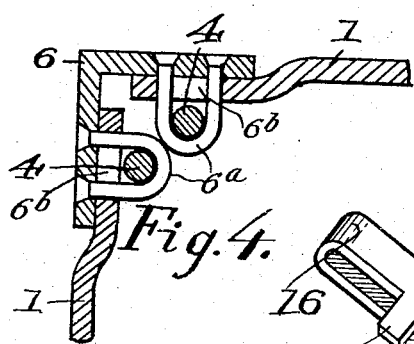
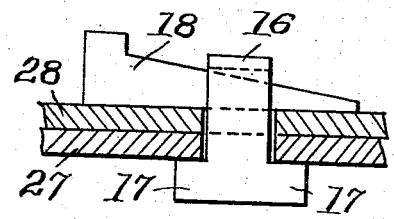
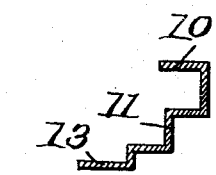
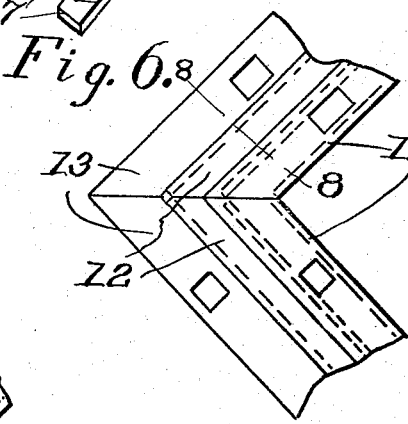
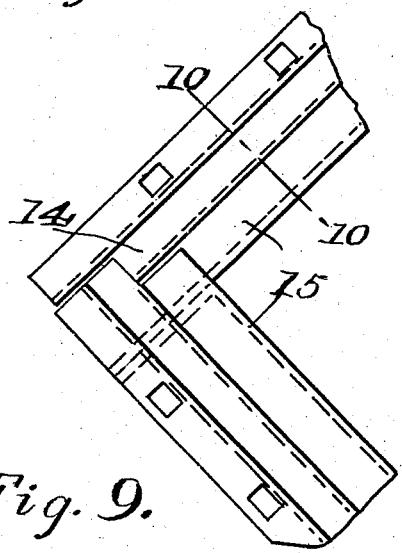
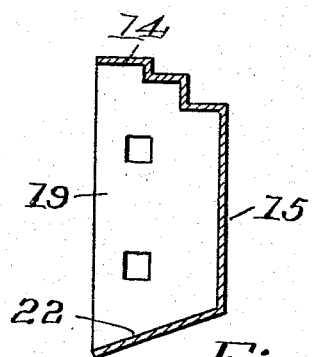
Inventor
W. R. Davis.
Witnesses

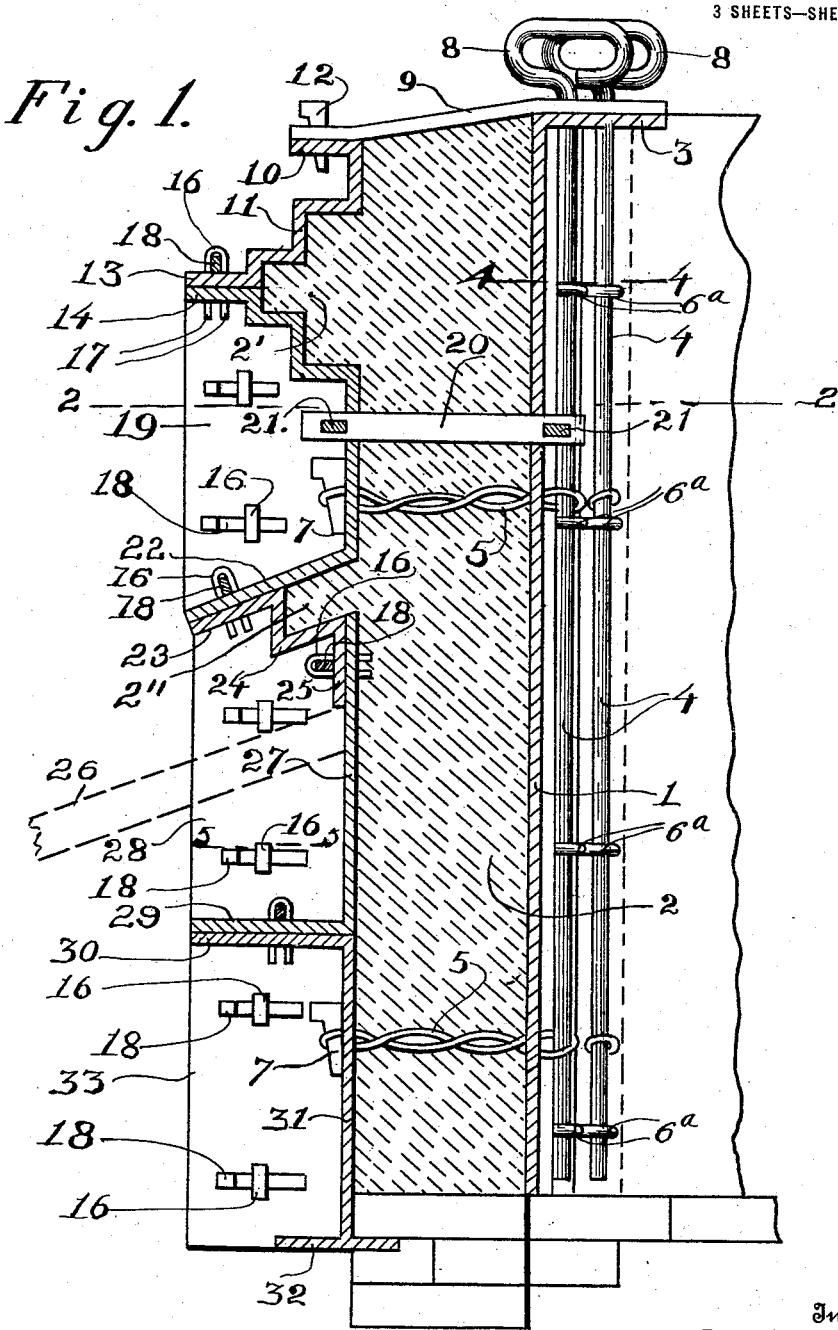

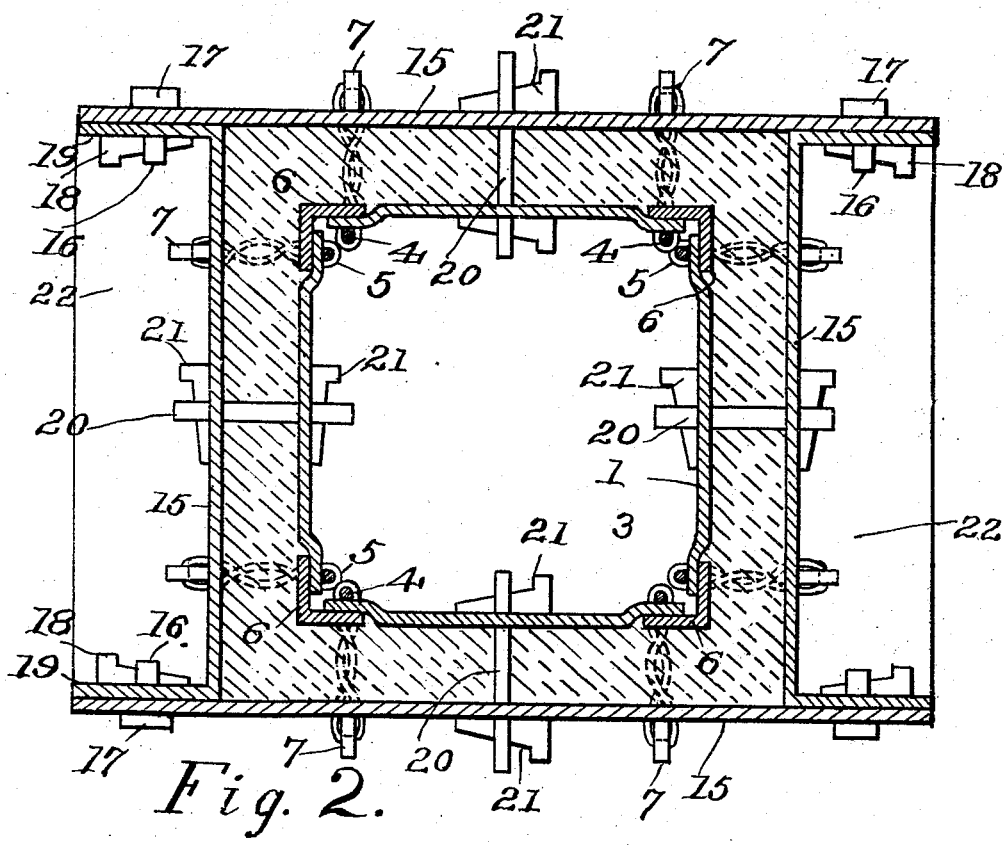
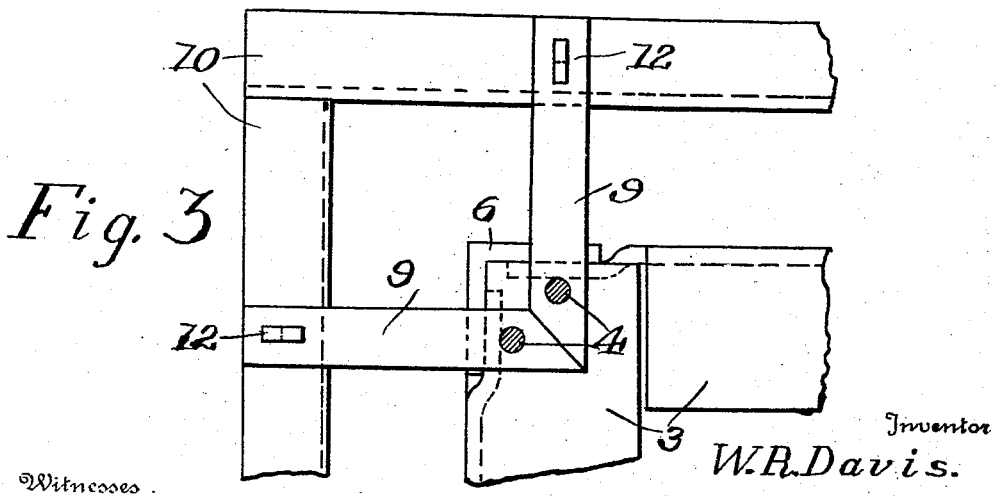

UNITED STATES PATENT OFFICE.

WILLIAM R. DAVIS, OF DORRANCETON, PENNSYLVANIA.

MOLD FOR CHIMNEYS AND THE LIKE.

1,186,384.   Specification of Letters Patent.   Patented June 6, 1916.

Application filed August 14, 1914. Serial No. 856,831.

*To all whom it may concern:*

Be it known that I, WILLIAM R. DAVIS, a citizen of the United States, residing at Dorranceton, in the county of Luzerne and State of Pennsylvania, have invented certain new and useful Improvements in Molds for Chimneys and the like; and I do hereby declare the following to be a full, clear, and exact description of the invention, such as will enable others skilled in the art to which it appertains to make and use the same.

This invention comprehends certain new and useful improvements in molds and has for its primary object to provide a sectional collapsible mold which will be especially adapted for forming chimneys and the like.

Another object of the invention is to provide a mold of this character which will be constructed for forming a specific type of chimney and which will be constructed in such manner that the parts of the inner and outer forms of the mold may be readily assembled and securely locked together.

The invention has for a further object to provide a device of this character including an outer mold form constructed in sections of simple formation and which will coöperate with the inner mold form to properly support a plastic chimney being molded between said outer and inner form.

The invention has for a still further object to provide inner and outer mold forms which will be constructed and secured together in such manner that they may be readily taken apart after the chimney is completed and folded in compact form.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a vertical section through my inner and outer mold forms in use. Fig. 2 is a transverse horizontal section through the same substantially on the plane of line 2—2 of Fig. 1. Fig. 3 is a fragmentary top plan view with the corner rods in section. Fig. 4 is an enlarged detail section on the plane of line 4—4 of Fig. 1. Fig. 5 is a similar view on the plane of line 5—5 of Fig. 1. Fig. 6 is a detail perspective view of one of the U-shaped clamps. Fig. 7 is a detail plan view showing the corners of the upper sections of the outer mold forms. Fig. 8 is a detail transverse section on the plane of line 8—8 of Fig. 7. Fig. 9 is a plan view, showing the corners of two of the sections forming the portion of the outer mold form immediately below the uppermost sections thereof, and Fig. 10 is a detail transverse section on the plane of line 10—10 of Fig. 9.

Referring more particularly to the drawings in which similar reference characters designate corresponding parts throughout the several views, 1 designates the vertically standing sections forming the inner mold form and extending the entire height of the chimney 2 and between the inner form and the other form which will be later fully described. The upper ends of the sections 1 are directed inwardly as at 3 and have suitable openings through which the corner rods 4 are extended, said corner rods 4 being also extended through the inner looped end of the twisted wires 5 which extend through the plastic chimney 2 and through the inner and outer mold forms. Right angled corner strips 6 engage the ends of the sections 1, and are provided with yokes in loops 6ª, which pass through openings 6ᵇ in the sections, and through which pass the rods 4, it being understood that the longitudinal vertical edges of the sections 1 are offset inwardly to bring the right angled portions 6 of the corner strips in alinement with the main portions of said sections 1, thereby making it possible to construct a chimney with a smooth inner face. The sections of the outer mold form are held in proper position with respect to the inner mold form by means of the wedge keys 7 engaged through the outer looped ends of the twisted wires 5. It will also be noted that the corner rods 4 have their upper ends looped to form the handles 8 by means of which said rods may be readily forced into position or removed, said rods 4 also assisting in retaining the sections of the outer mold form in proper position with respect to the inner mold form by being engaged through the inner ends of the upper inclined connecting and spacing strips 9 which are engaged over the inwardly directed upper ends 3 of the sections 1 of the inner mold form while the other ends of said connecting strips 9 are engaged over the outwardly directed upper edges 10 of the uppermost sections 11 of the outer mold form. The opposite ends of the connecting strips 9 are bent slightly at an angle to the main or inclined portion of said strips and the outer ends are secured to the outwardly directed upper edges 10 of the sections 11 by suitable wedge keys 12 similar to the wedge keys 7 engaged through registering openings in said strips 9 and edges 10. The outwardly directed lower edges 13 of the sections 11 rest upon the outwardly directed upper edges 14 of the sections 15 forming portions of the outer mold form immediately below the uppermost sections 11.

The edges 13 and 14 of the sections 11 and 15 respectively are secured together by the substantially U-shaped clamps 16 which extend through said edges and have the feet 17 formed upon their free ends and extended in opposite directions for engagement against the underface of the edges 14 while suitable wedge keys 18 are engaged through the main or central portions of said clamps 16 and bear against the upper face of the edges 13 of said sections 11, thereby drawing together and clamping said sections 11 and 15. It will be understood that the sections 11 and the upper portions of the sections 15 are provided with corresponding offset portions to form the ornamental shoulder 2' of the chimney 2 adjacent the upper portion thereof. In order to securely fasten together the sections 15 of the outer mold form, I have provided two of said sections with outwardly directed ends 19 at right angle to the main portion thereof and adapted to be securely clamped against the extended ends of the remaining sections 15 by means of U-shaped clamps 16 and wedge keys 18 previously mentioned.

The sections 15 are also connected with the inner form 1 by means of the connecting and bracing strips 20 which extend transversely through the sides of the chimney 2 and have their apertured ends projecting through the inner mold form 1 and the sections 15 of the outer mold form to receive suitable wedge keys 21, similar to the previously mentioned wedge keys.

Each section 15 of the outer mold form has a downwardly inclined lower edge 22, against the lower face of which is positioned the outwardly directed and slightly inclined upper angle 23 of the substantially W-shaped section 24 of the outer mold section which has the lower edge of its depending angle 25 resting upon the roof 26 around the edge of the chimney.

It will be understood that the substantially W-shaped section 24 coöperates with the downwardly inclined lower edge 22 of the section 15 to form the downwardly inclined flange 2'' of the chimney 2 and the depending lower angle 25 of the W-shaped section 24 is secured against the portion of the section 27 of the outer mold form projecting through the roof 26. It will further be understood that certain of the sections 27 have outwardly directed vertical sides 28, which are securely clamped to the extended ends of the remaining sections 27 by the clamps 16 and wedge keys 18 while the lower edges of the sections 27 are bent outwardly in substantially a horizontal plane and engaged against the correspondingly extending upper edges 30 of the lowermost sections 31, the lower edges of the sections 27 being designated by the numeral 29. The lowermost sections 31 of the outer mold form are provided with suitable base portions 32 and certain of said sections 31 have sides 33 extended at right angles and secured against the extended straight ends of the remaining sections 31 by the clamps 16 and wedge keys 18. The base portions 32 extend inwardly beyond the sections 31, and these inwardly extending portions are adapted to be embedded in the brick foundation of the chimney to support the mold in proper position upon the brick foundation.

From the foregoing it will be evident that I have provided a sectional mold for chimneys and the like composed of inner and outer mold forms which may be readily assembled and connected and secured in proper position with respect to one another. It will also be evident that if desired, the sections 27 of the outer mold form may be left in position after the chimney is completed to prevent leakage around said chimney.

While the preferred embodiment has been shown and illustrated, it will be understood that minor changes in the details of construction and arrangement of parts may be made within the scope of the appended claims without departing from the spirit of the invention or sacrificing any of the advantages thereof.

What is claimed is:—

1. A chimney mold comprising an inner member resting at its lower edge upon the upper end of the brick foundation of the chimney, an outer form embracing the brick foundation at a point below the lower edge of the inner form, and means for securing the inner form in proper spaced relation to the outer form.

2. A chimney mold comprising an inner form adapted to rest on its lower edge upon the upper end of the brick foundation of the chimney, an outer form extending below the upper edge of and embracing the brick foundation, an inturned base on the outer form, said base adapted to be embedded in the brick foundation, and means securing the inner form in proper spaced relation to the outer form.

3. A chimney mold comprising an inner form adapted to rest on its lower end upon the upper end of the brick foundation of the chimney, a sectional outer form extending below the upper end of and embracing the chimney, a base extending inwardly from the lower end of the outer form, said base adapted to be embedded in the foundation, means for detachably securing the sections of the outer form in assembled relation, and means securing the inner form in proper spaced relation to the outer form, the sections of the outer form being adapted to be removed one at a time to permit the withdrawal of the base from the foundation.

4. A mold of the character set forth including an inner form comprising a plurality of side sections having their longitudinal edges offset inwardly, right angled corner strips engaging the inwardly offset longitudinal edges of the sections, loops carried by the corner strips and passing through the offset ends of the sections, and rods located on the inner side of said offset ends, and passing downwardly through the loops.

5. A mold of the character set forth including an outer form comprising side walls, sectional end walls, each end wall section having horizontal and vertical flanges, means engaging the horizontal flanges to secure the end wall sections in assembled relation, and means passing through the side walls and the vertical flanges to secure the end walls to the side walls.

6. A mold comprising a sectional inner form, corner strips, loops carried by the corner strips, and passing through said sections, an outer form, connecting and spacing strips secured to the outer form and extending therefrom in the direction of and beyond the inner form, rods passing through said loops and said strips, and said rods being located within the inner form.

7. A chimney mold comprising an inner form, a plurality of sectional outer forms, one of said outer forms provided with a base adapted to be inserted in the chimney, a flange formed on the upper end thereof, a second sectional outer form provided with a flange on the lower end thereof and adapted to rest on the first mentioned flange, a substantially W-shaped section secured to the upper end of the second mentioned sectional outer form, a third sectional outer form provided with an outwardly and downwardly inclined flange adapted to rest on the W-shaped section, said third mentioned sectional outer form bent at its upper end in step formation in an outward direction, a fourth sectional outer form clamped in step formation and in an inward direction and adapted to rest upon the step formation of the third sectional outer form, means for securing said plurality of outer forms together and means securing the inner forms in proper spaced relation to the outer sectional form.

In testimony whereof I affix my signature in presence of two witnesses.

WILLIAM R. DAVIS.

Witnesses:
C. L. NESBITT,
J. E. WALTON.

Copies of this patent may be obtained for five cents each, by addressing the "Commissioner of Patents, Washington, D. C."